(12) United States Patent
Huang et al.

(10) Patent No.: US 11,893,765 B2
(45) Date of Patent: Feb. 6, 2024

(54) METHOD AND APPARATUS FOR RECOGNIZING IMAGED INFORMATION-BEARING MEDIUM, COMPUTER DEVICE AND MEDIUM

(71) Applicant: BOE TECHNOLOGY GROUP CO., LTD., Beijing (CN)

(72) Inventors: Guangwei Huang, Beijing (CN); Ruibin Xue, Beijing (CN); Bingchuan Shi, Beijing (CN); Yue Li, Beijing (CN); Jibo Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 418 days.

(21) Appl. No.: 17/279,684

(22) PCT Filed: May 20, 2020

(86) PCT No.: PCT/CN2020/091368
§ 371 (c)(1),
(2) Date: Mar. 25, 2021

(87) PCT Pub. No.: WO2020/233611
PCT Pub. Date: Nov. 26, 2020

(65) Prior Publication Data
US 2022/0036115 A1 Feb. 3, 2022

(30) Foreign Application Priority Data
May 20, 2019 (CN) .......................... 201910417247.6

(51) Int. Cl.
*G06V 10/24* (2022.01)
*G06T 7/13* (2017.01)
(Continued)

(52) U.S. Cl.
CPC ......... *G06V 10/247* (2022.01); *G06K 7/1413* (2013.01); *G06N 3/02* (2013.01);
(Continued)

(58) Field of Classification Search
CPC .. G06V 10/247; G06V 30/413; G06V 10/454; G06V 30/1478; G06V 10/82;
(Continued)

(56) References Cited

U.S. PATENT DOCUMENTS

2006/0088214 A1* 4/2006 Handley .............. G06V 30/416
382/176
2012/0106844 A1* 5/2012 Ramachandrula ..........................
G06V 30/1478
382/199
(Continued)

FOREIGN PATENT DOCUMENTS

CN 104966097 A 10/2015
CN 107657251 A 2/2018
(Continued)

*Primary Examiner* — Pinalben Patel
(74) *Attorney, Agent, or Firm* — DINSMORE & SHOHL LLP

(57) ABSTRACT

A method and apparatus for recognizing an imaged information-bearing medium, a computer-readable storage device and a computer device are provided. The method comprising: acquiring a first image of the imaged information-bearing medium; performing text recognition on the first image to acquire a text content of the imaged information-bearing medium; classifying the imaged information-bearing medium to acquire a type of the imaged information-bearing medium; and archiving the text content according to the type.

14 Claims, 7 Drawing Sheets

(51) Int. Cl.
*G06V 30/413* (2022.01)
*G06V 30/146* (2022.01)
*G06V 10/94* (2022.01)
*G06V 10/44* (2022.01)
*G06K 7/14* (2006.01)
*G06N 3/02* (2006.01)
*G06T 3/60* (2006.01)
*G06V 10/82* (2022.01)

(52) U.S. Cl.
CPC .................. *G06T 3/60* (2013.01); *G06T 7/13* (2017.01); *G06V 10/44* (2022.01); *G06V 10/454* (2022.01); *G06V 10/82* (2022.01); *G06V 10/95* (2022.01); *G06V 30/1478* (2022.01); *G06V 30/413* (2022.01); *G06T 2207/20084* (2013.01); *G06T 2207/30176* (2013.01)

(58) Field of Classification Search
CPC .......... G06V 10/95; G06V 10/44; G06T 7/13; G06T 3/60; G06T 2207/20084; G06T 2207/30176; G06K 7/1413; G06N 3/02
See application file for complete search history.

(56) References Cited

U.S. PATENT DOCUMENTS

| | | | |
|---|---|---|---|
| 2014/0193029 A1* | 7/2014 | Vassilieva | G06V 30/15 382/103 |
| 2019/0206052 A1* | 7/2019 | Hu | G06T 7/136 |
| 2021/0117666 A1* | 4/2021 | Kaynig-Fittkau | G06V 30/414 |
| 2021/0133476 A1* | 5/2021 | Goodman | G06F 18/214 |
| 2021/0182477 A1* | 6/2021 | Kishimoto | G06F 40/186 |
| 2021/0182547 A1* | 6/2021 | Ayyadevara | G06V 10/82 |
| 2021/0182549 A1* | 6/2021 | Ustuntas | G06V 30/224 |
| 2021/0286989 A1* | 9/2021 | Zhong | G06F 40/177 |
| 2023/0153335 A1* | 5/2023 | McNeill | G06F 16/316 707/741 |

FOREIGN PATENT DOCUMENTS

| | | | | |
|---|---|---|---|---|
| CN | 109241857 A | | 1/2019 | |
| CN | 109241894 A | | 1/2019 | |
| CN | 109241894 B | * | 4/2022 | ......... G06K 9/00449 |

* cited by examiner

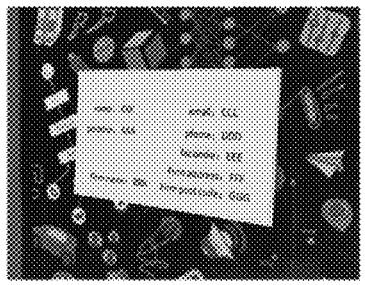
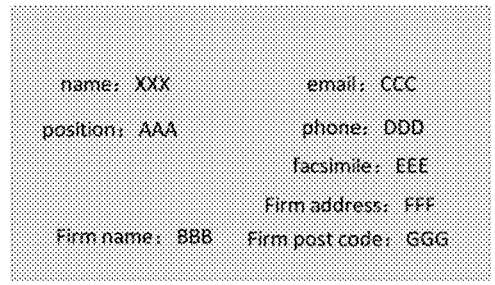
FIG. 4a             FIG. 4b
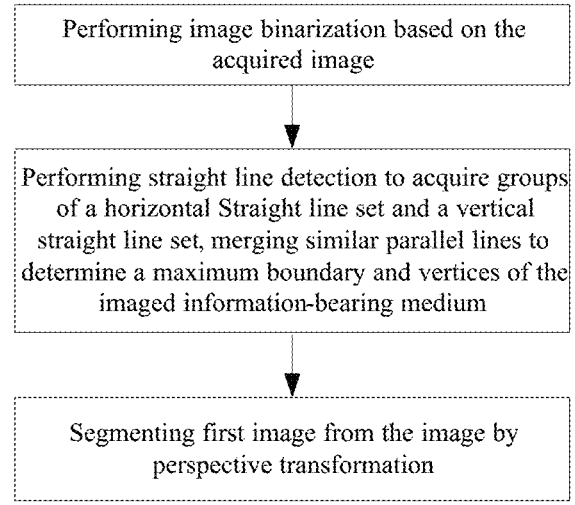
FIG. 5
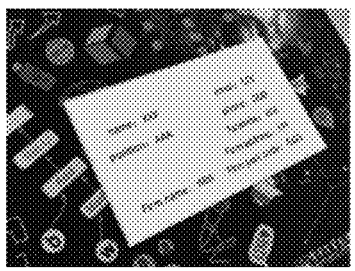
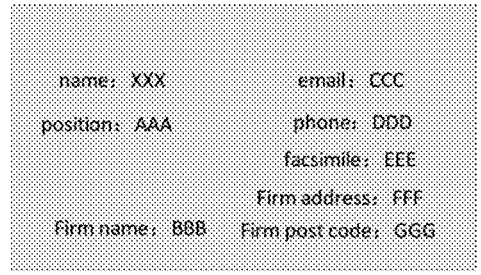
FIG. 6a             FIG. 6b

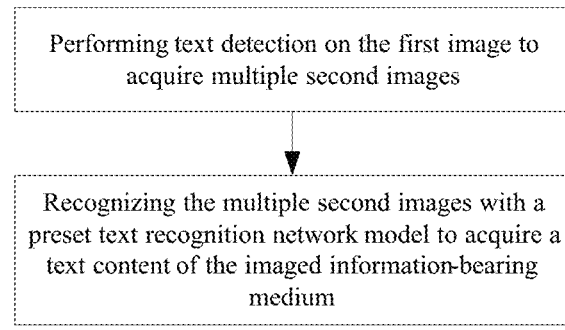
FIG. 7
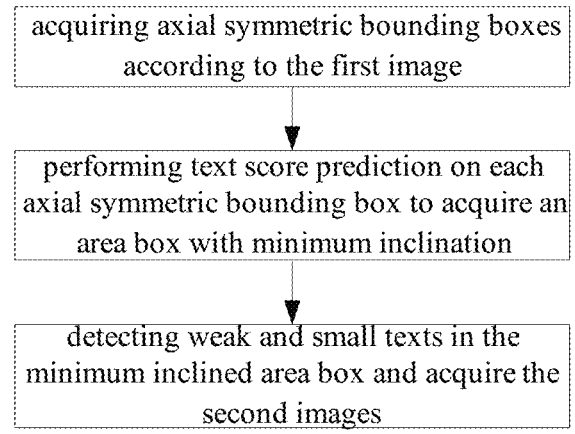
FIG. 8
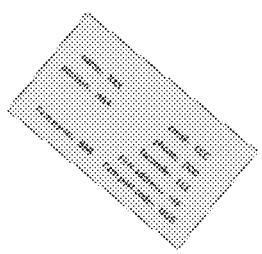     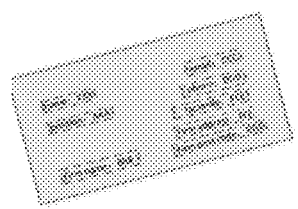     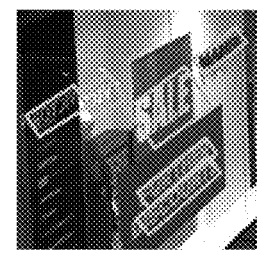
FIG. 9a              FIG. 9b              FIG. 9c
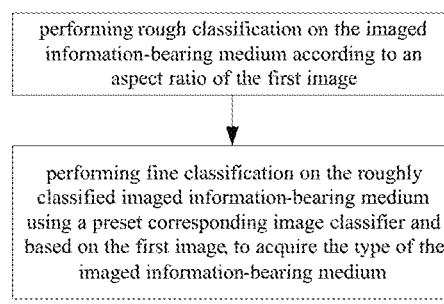
FIG. 10

METHOD AND APPARATUS FOR RECOGNIZING IMAGED INFORMATION-BEARING MEDIUM, COMPUTER DEVICE AND MEDIUM

CROSS REFERENCE TO RELATED APPLICATIONS

This application is a national stage of International Application No. PCT/CN2020/091368, filed on May 20, 2020, which claims priority to Chinese Patent Application No. 201910417247.6, filed on May 20, 2019. Both of the aforementioned applications are hereby incorporated by reference in their entireties.

TECHNICAL FIELD

The present disclosure relates to a method and apparatus for recognizing an imaged information-bearing medium, a computer readable storage medium and a computer device.

BACKGROUND

With the development of image processing technology, the application of OCR technology to recognize an imaged information-bearing medium has become more common. The main form of OCR recognition application on the market is to call the program on a mobile phone, and then upload and return the result of recognition after a picture of the imaged information-bearing medium is taken. As a result, such products have the following problems:

The recognition of each type of the imaged information-bearing medium corresponds to a separate application (such as the waybill recognition, the business card recognition, the ID card recognition, etc.). If people want to recognize different objects, they need to switch among different applications.

The insufficient ability of recognizing the imaged information-bearing medium that is rotated by a large angle, and even a small angle rotation cannot be automatically corrected;

When the background contains other texts, they will be mistakenly recognized as the content of the imaged information-bearing medium;

When the imaged information-bearing medium is photographed, if the incident angle and the imaged information-bearing medium has a certain angle, the photograph of the imaged information-bearing medium will have trapezoidal distortion and cause character recognition failure.

SUMMARY

According to some embodiments of the present disclosure, there is provided a method for recognizing an imaged information-bearing medium, including: acquiring a first image of the imaged information-bearing medium; performing text recognition on the first image to acquire a text content of the imaged information-bearing medium; classifying the imaged information-bearing medium to acquire a type of the imaged information-bearing medium; and archiving the text content according to the type, wherein performing text recognition on the first image to acquire a text content of the imaged information-bearing medium includes: performing text detection on the first image to acquire multiple second images; and recognizing the multiple second images with a preset text recognition network model to acquire the text content of the imaged information-bearing medium.

According to some embodiments of the present disclosure, acquiring a first image of the imaged information-bearing medium comprises: performing target detection and correction on the imaged information-bearing medium in an original image based on the acquired original image to acquire the first image; determining whether a deformation of the first image is within a preset degree of deformation, and if not, performing text direction detection on the first image and rotating the first image to correct the first image.

According to some embodiments of the present disclosure, performing target detection and correction on the imaged information-bearing medium in an original image based on the acquired original image to acquire the first image comprises: performing image binarization based on the acquired original image; performing edge detection to acquire a outline of the largest rectangle in the original image; segmenting the first image from the original image by perspective transformation.

According to some embodiments of the present disclosure, performing target detection and correction on the imaged information-bearing medium in an original image based on the acquired original image to acquire the first image comprises: performing image binarization based on the acquired original image; performing straight line detection to acquire groups of a horizontal straight line set and a vertical straight line set, and merging approximate parallel lines to determine an optimal boundary and vertices of the imaged information-bearing medium; and segmenting the first image from the original image through perspective transformation.

According to some embodiments of the present disclosure, performing text direction detection on the first image and rotating the first image to correct the first image comprises: performing text direction detection on the first image with a preset full-angle text detection classification model and output a rotation angle; and rotating the first image by the rotation angle.

According to some embodiments of the present disclosure, performing text detection on the first image to acquire multiple second images comprises: acquiring axial symmetric bounding boxes according to the first image; performing text score prediction on each axial symmetric bounding box to acquire area box with minimum inclination; and detecting weak and small texts in the area box with minimum inclination and acquire the multiple second images.

According to some embodiments of the present disclosure, the preset text recognition network model comprises a CRNN text recognition network model, and the CRNN text recognition network model combines both a CNN convolutional neural network and an RNN recurrent neural network, wherein recognizing the multiple second images with a preset text recognition network model to acquire the text content of the imaged information-bearing medium includes: inputting the multiple second images into the CRNN text recognition network model; and recognizing the multiple second images as character strings according to a process of the CNN convolutional neural network-LSTM long short-term memory network-CTC connectionist temporal classification.

According to some embodiments of the present disclosure, archiving the text content according to the type comprises: archiving the text content using a preset corresponding text archiving template according to the type, and acquiring archiving information of the imaged information-bearing medium.

According to some embodiments of the present disclosure, after acquiring the first image of the imaged information-bearing medium, and before performing text recognition on the first image to acquire a text content of the imaged information-bearing medium, the method further includes: performing barcode detection on the first image.

According to some embodiments of the present disclosure, performing barcode detection on the first image comprises: performing image rotation correction on the first image; performing noise reduction processing on the corrected first image; performing edge detection on the noise-reduced first image to acquire an edge image; and detecting and filtering the edge image with probability transformation to determine whether there is a barcode, if not, exiting the barcode detection, and if yes, performing horizontal expansion on the line segment at the edge of the barcode to acquire a connected domain, determining a barcode area of the barcode according to the connected domain, and performing decoding processing to recognize the imaged information-bearing medium.

According to some embodiments of the present disclosure, classifying the imaged information-bearing medium to acquire a type of the imaged information-bearing medium comprises: performing rough classification on the imaged information-bearing medium according to an aspect ratio of the first image; and performing fine classification on the roughly classified imaged information-bearing medium using a preset corresponding image classifier and based on the first image, to acquire the type of the imaged information-bearing medium.

According to some embodiments of the present disclosure, classifying the imaged information-bearing medium to acquire a type of the imaged information-bearing medium comprises: performing rough classification on the imaged information-bearing medium according to an aspect ratio of the first image; and performing fine classification on the roughly classified imaged information-bearing medium using a preset corresponding text classifier and based on the text content, to acquire the type of the imaged information-bearing medium.

According to some embodiments of the present disclosure, an apparatus for recognizing an imaged information-bearing medium is provided, comprising: a distortion correction module configured to acquire a first image of the imaged information-bearing medium; a text recognition module configured to perform text recognition on the first image to acquire a text content of the imaged information-bearing medium; an imaged information-bearing medium classification module configured to classify the imaged information-bearing medium to acquire a type of the imaged information-bearing medium; and a text archiving module configured to archive the text content according to the type, wherein the text recognition module is further configured to: perform text detection on the first image to acquire multiple second images; and recognize the multiple second images with a preset text recognition network model to acquire the text content of the imaged information-bearing medium.

According to some embodiments of the present disclosure, the apparatus for recognizing an imaged information-bearing medium further comprises: a barcode detection module configured to perform barcode detection on the first image.

According to some embodiments of the present disclosure, a computer-readable storage medium on which a computer program is stored is provided, when the program is executed by a processor: acquiring a first image of the imaged information-bearing medium; performing text recognition on the first image to acquire a text content of the imaged information-bearing medium; classifying the imaged information-bearing medium to acquire a type of the imaged information-bearing medium; and archiving the text content according to the type, wherein performing text recognition on the first image to acquire a text content of the imaged information-bearing medium includes: performing text detection on the first image to acquire multiple second images; and recognizing the multiple second images with a preset text recognition network model to acquire the text content of the imaged information-bearing medium.

According to some embodiments of the present disclosure, a computer device is provided, comprising a storage, a processor, and a computer program stored in the storage and capable of running on the processor, and when the processor executes the program: acquiring a first image of the imaged information-bearing medium; performing text recognition on the first image to acquire a text content of the imaged information-bearing medium; classifying the imaged information-bearing medium to acquire a type of the imaged information-bearing medium; and archiving the text content according to the type, wherein performing text recognition on the first image to acquire a text content of the imaged information-bearing medium includes: performing text detection on the first image to acquire multiple second images; and recognizing the multiple second images with a preset text recognition network model to acquire the text content of the imaged information-bearing medium.

BRIEF DESCRIPTION OF THE DRAWINGS

The specific embodiments of the present disclosure will be described in further detail below with reference to the accompanying drawings.

FIGS. 4a-4b show schematic diagrams of stages of the distortion correction based on rectangle detection according to some embodiments of the present disclosure;

FIG. 5 shows a flowchart of the distortion correction based on straight line detection in some embodiments of the present disclosure;

FIGS. 6a-6b show schematic diagrams of stages of distortion correction based on straight line detection according to some embodiments of the present disclosure;

FIG. 7 shows a flowchart of character recognition according to some embodiments of the present disclosure;

FIG. 8 shows a flowchart of character detection according to some embodiments of the present disclosure;

FIGS. 9a-9c show schematic diagrams of stages of character detection according to some embodiments of the present disclosure;

FIG. 10 shows a flowchart of image classification according to some embodiments of the present disclosure;

DETAILED DESCRIPTIONS

Figure 1:
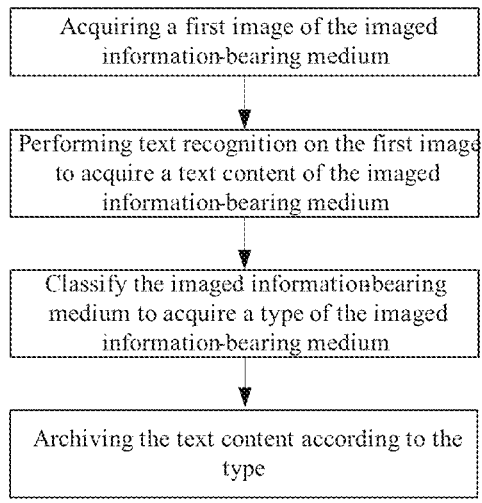
FIG. 1 shows a flowchart of the identification method according to some embodiments of the present disclosure.

In order to explain the present disclosure more clearly, the following further describes the present disclosure with reference to preferred embodiments and drawings. Similar components in the drawings are denoted by the same reference numerals. Those skilled in the art should understand that the content specifically described below is illustrative rather than restrictive, and should not be used to limit the protection scope of the present disclosure.

In view of the current existing problems, the present disclosure provides a method and apparatus for recognizing an imaged information-bearing medium, a computer readable storage device and a computer device. Image classifiers or text classifiers recognize different types of imaged information-bearing medium, which can make up for the problem of only identifying a single type of an imaged information-bearing medium in the prior art, effectively improving the efficiency of image processing, and has a wide range of application prospects.

As shown in FIG. 1, in some embodiments of the present disclosure, there is provided a method for recognizing an imaged information-bearing medium, including: acquiring a first image of the imaged information-bearing medium; performing text recognition on the first image to acquire a text content of the imaged information-bearing medium; classify the imaged information-bearing medium to acquire the type of the imaged information-bearing medium; and character archiving the text content according to the type.

In a specific example, as shown in FIG. 1, taking the recognition of a business card as an example, the recognition method specifically includes:

first, acquiring the first image of the imaged information-bearing medium.

Acquire an image that includes the business card. The business card in the image may be in an abnormal mode. For example, if the business card in the image is in a deformed state, the text in the business card is also in a deformed state and is not easy to recognize; or there are characters or other words in the background of the business card in the image, they may be mistaken for words in the business card.

Figure 2:
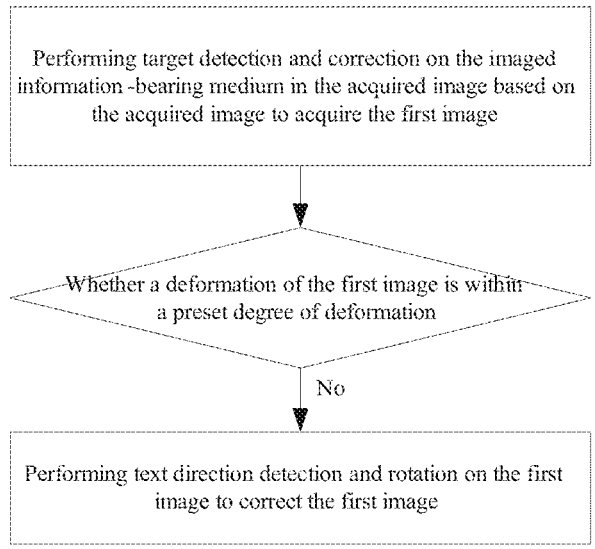
FIG. 2 shows a flowchart of the distortion correction according to some embodiments of the present disclosure.

In order to solve the above problem, as shown in FIG. 2, in an exemplary embodiment, acquiring the first image of the imaged information-bearing medium includes: performing target detection and correction on the imaged information-bearing medium in the original image based on the acquired original image to acquire the first image; determine whether the deformation of the first image is smaller than a preset degree of deformation, and if not, detect a direction of the text and rotate the first image to correct the first image.

That is, the business card itself is accurately identified from the acquired original image, the business card is segmented from the original image, the quadrilateral is stretched according to the true ratio of the business card to acquire the first image which realizes distortion correction of the acquired original image, and restore the deformed text in the business card, thereby solving the problem of misrecognition of text due to the deformed state of the business card or the presence of characters or words in the background.

Figure 3:
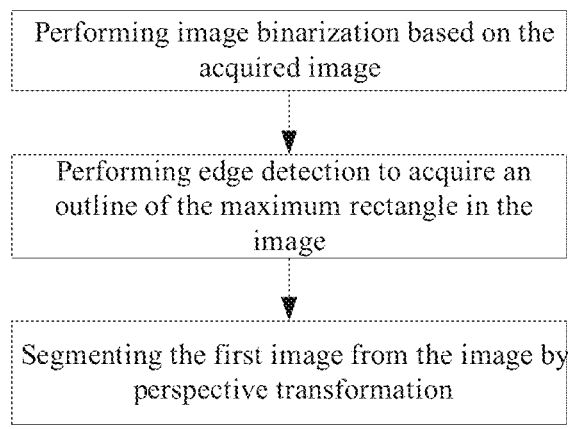
FIG. 3 shows a flowchart of the distortion correction based on rectangle detection in some embodiments of the present disclosure.

In this embodiment, target detection is provided to recognize a business card image, for example, correction is performed by rectangular target detection, as shown in FIG. 3. In an exemplary embodiment, performing target detection and correction on the imaged information-bearing medium based on the acquired original image to acquire the first image includes: performing image binarization based on the acquired original image; performing edge detection to acquire the outline of the largest rectangle in the original image; segmenting the first image from the original image according to perspective transformation.

For example, as shown in FIG. 4a, distortion processing is performed on the original image including the deformed business card:

First, the image binarization is performed on the acquired original image, and the image is binarized.

Then, edge detection is performed to acquire the outline of the largest rectangle in the original image, and the binarized original image is expanded and corroded. For example, according to some embodiments of the present disclosure, the canny algorithm is used for edge detection, and then searching for the largest rectangle in the original image and acquiring the outline of the rectangle.

Finally, the image of the imaged information-bearing medium is segmented from the original image through perspective transformation. According to some embodiments of the present disclosure, through four-point perspective transformation, as shown in FIG. 4b, the first image including the business card is segmented from the acquired original image.

According to some embodiments of the present disclosure, another target detection method is also provided to recognize the image of the business card. As shown in FIG. 5, in an exemplary embodiment, performing target detection and correction on the imaged information-bearing medium based on the acquired original image to acquire the first image includes: performing image binarization based on the acquired original image; performing straight line detection to acquire groups of a horizontal straight line set and a vertical straight line set, and merging approximate parallel lines to determine an optimal boundary and vertices of the imaged information-bearing medium; segmenting the first image from the original image through perspective transformation.

For example, as shown in FIG. 6a, distortion processing is performed on the original image including the deformed business card:

First, the image binarization is performed based on the acquired original image, and the image is binarized.

Then, straight line detection is performed to acquire the groups of the horizontal straight line set and the vertical straight line set, and the approximate parallel lines are combined to determine the optimal boundary and vertex of the imaged information-bearing medium. For example, according to some embodiments of the present disclosure, LSD straight line detection is performed, acquiring the groups of the horizontal straight line set and the vertical straight line set in the original image, merge the approximate parallel lines in the horizontal line set and the vertical line set, so as to determine the optimal boundary and vertex in the original image.

Finally, the image of the imaged information-bearing medium is segmented from the original image through perspective transformation. According to some embodiments of the present disclosure, through four-point perspective transformation, as shown in FIG. 6*b*, the first image including the business card is segmented from the acquired original image.

The edges in the image is detected by the edge algorithm, or the image in the image is detected by the straight line detection algorithm, both may cause business card detection failure due to unclear edges of the business card or shading of the business card in the image. According to some embodiments of the present disclosure, image quality requirements are preset, and image quality judgments are performed on the first image acquired through edge detection or straight line detection according to the preset image quality requirements. The text detection is continued if the quality requirements are met. Otherwise, perform text direction detection on the acquired first image to correct the first image.

According to some embodiments of the present disclosure, performing text direction detection and rotation on the first image to correct the first image includes: performing text direction detection on the first image using a preset full-angle text detection classification model and outputting a rotation angle; rotating the first image by the rotation angle.

According to some embodiments of the present disclosure, a preset full-angle text detection classification model is used, which is based on the VGG16 model and can quickly perform angle correction on images after pre-training and testing, wherein the full-angle includes 0-360 degrees, discretizing the acquired image with steps of 10 degrees to detect the text in the image. The first image is input into the classification model, and the first image is corrected according to the angle output by the classification model.

Second, perform text recognition on the first image to acquire the text content of the imaged information-bearing medium.

Considering that the first image is segmented based on the acquired image, it is inevitable that the text in the picture will be inclined, distorted, blurred, etc. To solve the problem of the text being inclined in the first image, according to some embodiments of the present disclosure, as shown in FIG. 7, the performing text recognition on the first image to acquire the text content of the imaged information-bearing medium includes: performing text detection on the first image to acquire multiple second images; recognizing the plurality of second images with a preset text recognition network model to acquire the text content of the imaged information-bearing medium.

That is, the text in the first image is corrected by text detection.

For example, as shown in FIG. 8, performing text detection on the first image to acquire a plurality of second images includes: acquiring axial symmetric bounding boxes according to the first image; performing text score prediction on each axial symmetric bounding box to acquire an area box with minimum inclination; detecting weak and small texts in the minimum inclined area box and acquire multiple second images.

According to some embodiments of the present disclosure, text is used to detect a text box image containing text in the first image, that is, the first image is further processed to reduce the image range to individual text box, thereby improving the accuracy and generalization of the image processing.

As shown in FIGS. 9*a*-9*c*, according to some embodiments of the present disclosure, a text detection network is used for text detection, which is based on the Faster R-CNN target detection framework.

First, the RPN is used to generate an aligned axial symmetric bounding box surrounding the text.

Then, for each text box, the text score, the axial symmetric bounding box and the inclined minimum area box are simultaneously predicted.

Finally, considering that there may be small and weak texts in the first image, a small anchor is added to the text detection network to detect small and weak texts, and an inclined NMS post-processing detection frame is used to acquire the final detection result.

The text detection network used in some embodiments of the present disclosure can solve the distortion of text in the picture, and effectively improve the accuracy and speed of text detection.

After the first image has undergone text detection to acquire multiple second images, as shown in FIGS. 9*a*-9*c*, the sizes of the second images are different, and the text in each second image needs to be further recognized through a text recognition network.

For example, a preset text recognition network model is used to recognize the multiple second images to acquire the text content of the imaged information-bearing medium.

In this embodiment, the text recognition network model is the CRNN text recognition network model, which combines the characteristics of the CNN network and the RNN network, and can scale the text frame image to a fixed length in the vertical direction. Compared with the traditional text recognition model, character segmentation and horizontal scaling are no longer performed, which can improve the recognition speed; at the same time, the model can also recognize character sequences of any length, and is no longer limited by character length. Moreover, compared with the traditional non-end-to-end text recognition network model, this model can realize end-to-end training and improve the accuracy of text recognition. It is worth noting that the training of this model is flexible, and it can train a dictionary-based text recognition network model or a non-dictionary-based text recognition network model, and the model has the characteristics of small size and fast recognition speed.

The multiple second images acquired through text detection is input into the CRNN text recognition network model, for example, according to the process of CNN (Convolutional Neural Network)-LSTM (Long Short Term Memory Network)-CTC (Connectionist Temporal Classification) to acquire a result of the recognition, the second image is recognized as a character string, that is, the text content corresponding to each second image is acquired to acquire the text content of the imaged information-bearing medium. The CRNN text recognition network model has a high accuracy rate for the recognition results of Chinese and English, and can recognize continuous texts of any length.

So far, the basic processing of the acquired image including the business card is completed. It is worth noting that other types of media bearing imaged information can also implement the preprocessing of the acquired image according to the above steps to prepare for subsequent type classification.

Third, classify the imaged information-bearing medium to acquire the type of the imaged information-bearing medium.

In order to realize the text archiving of the text content of the above-mentioned imaged information-bearing medium, the type of the imaged information-bearing medium needs to be determined.

As shown in FIG. 10, in an exemplary embodiment, the classifying the imaged information-bearing medium to acquire the type of the imaged information-bearing medium includes: roughly classifying the imaged information-bearing medium according to the aspect ratio of the first image; performing fine classification, with a preset corresponding image classifier, on the roughly classified imaged information-bearing medium based on the first image, to acquire the type of the imaged information-bearing medium.

First, the imaged information-bearing medium is roughly classified according to the aspect ratio of the first image.

Since various media bearing imaged information have different aspect ratios, in this embodiment, the image of the media bearing imaged information with quadrilateral outlines that are segmented from the first image are tiled, and the imaged information-bearing medium is roughly classified according to the preset range of aspect ratio.

Secondly, the roughly classified imaged information-bearing medium is fine classified with a preset corresponding image classifier based on the first image, to acquire the type of the imaged information-bearing medium.

According to some embodiments of the present disclosure, an image classifier corresponding to the aspect ratio of the first image is selected from a plurality of preset image classifiers, and the selected image classifier is used to classify the first image to acquire the type of the imaged information-bearing medium.

It is worth noting that the plurality of preset image classifiers include image classifiers which know various aspect ratios of imaged information-bearing medium, and the image classifiers are trained by a large number of collected samples of various imaged information-bearing medium. For example, a large number of information-bearing media such as taxi invoices, shopping receipts, ordinary invoices, ID cards and passports are uniformly scaled into images of the same resolution and are noted with classification. A large number of collected samples are input, for example, into inception, vgg, resnet and other networks to train image classifiers corresponding to each of the aspect ratios using common networks for classification tasks.

Since different imaged information-bearing medium have different features such as different typesetting rules, background textures, colors, and character photos, etc., the effective classification features can be better learned through the classification task network. In this embodiment, the classification strategy of the imaged information-bearing medium is as follows: determining a shape, that is, classifying according to the aspect ratio, and classifying the specific imaged information-bearing medium image using the image classifier corresponding to each classification to acquire the type of imaged information-bearing medium. It is worth noting that when classifying according to shape, it is not limited that each kind of imaged information-bearing medium corresponds to one classification network model. The imaged information-bearing medium with similar aspect ratio can be divided into one category, for example, taxi invoices and shopping receipts are classified into one category, and value-added tax invoices, passports, ID cards, train tickets, and waybills are classified into one category.

Figure 11:
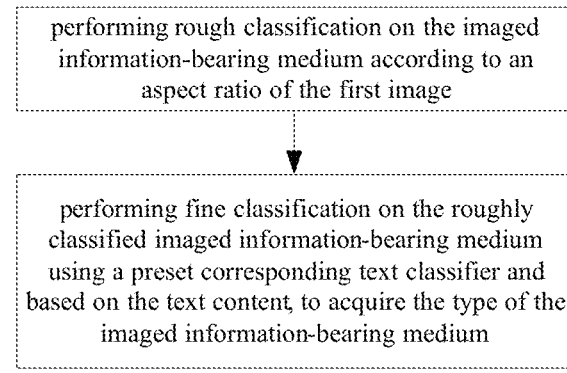
FIG. 11 shows a flowchart of text classification according to some embodiments of the present disclosure.

As shown in FIG. 11, in an exemplary embodiment, classifying the imaged information-bearing medium to acquire the type of the imaged information-bearing medium includes: roughly classifying the image-based information-bearing medium according to the aspect ratio of the first image; performing fine classification on the roughly classified image-based information-bearing medium using a preset corresponding text classifier and based on the text content to acquire the type of the imaged information-bearing medium.

In this embodiment, the specific steps are as follows:

First, the imaged information bearing medium is roughly classified according to the aspect ratio of the first image.

Since various imaged information bearing media have different aspect ratios, in this embodiment, the images of the imaged information bearing media with quadrilateral outlines that are segmented from the first image are tiled, and the imaged information-bearing medium are roughly classified according to the preset range of the aspect ratio.

Secondly, the roughly classified imaged information-bearing medium is fine classified based on the text content with a preset corresponding text classifier, to acquire the type of the imaged information-bearing medium.

In this embodiment, the text classifier corresponding to the aspect ratio of the first image is selected from a plurality of preset text classifiers, and the text classifier is used for classification according to the text content to acquire the type of imaged information-bearing medium.

It should be noted that the plurality of preset text classifiers include text classifiers that know various aspect ratios of the imaged information-bearing medium. In this embodiment, the text classifier is a classification model including LSTM and a fully connected layer. The training of the text classifier includes: reading in data, that is, dividing the first 100 characters of the text content acquired by text recognition with jieba, labeled according to the category of the bill; then, a dictionary is built to train the text classification model.

Fourth, the text content is archived according to the type.

Considering that the same type of imaged information-bearing medium may also have different typesetting, business cards are still used as an example for illustration. For example, business cards include various typesetting and layouts. Each type of business card contains different information, and their distributions are different. Therefore, it is necessary to set up different text archiving templates in advance to extract the key information in the business card and exclude the redundant information therein. Therefore, for the text content recognized from the text, the text archiving template is used for archiving processing.

In an exemplary embodiment, the text archiving of the text content according to the type includes: text archiving the text content using a preset corresponding text archiving template according to the type, and acquiring the archiving information of the imaged information-bearing medium.

In a specific example, a text archive template is created for business cards. The template includes 6 types of entries, such as: "name", "position", "company", "address", "mobile phone" and "mailbox". "Name" is determined by that the entry has only 2 to 4 Chinese characters and is unique; "position", "company" and "address" are determined based on keywords, for example those including "city", "district" and other keywords are judged to be the address; "mobile phone" is determined by judging whether the entry contains consecutive numbers greater than or equal to 11 digits, and the last 11 to 10 digits are "13", "15" or "18"; "mailbox" is determined by judging that the entry contains "@" and contains" com" or "cn".

Figure 12A:
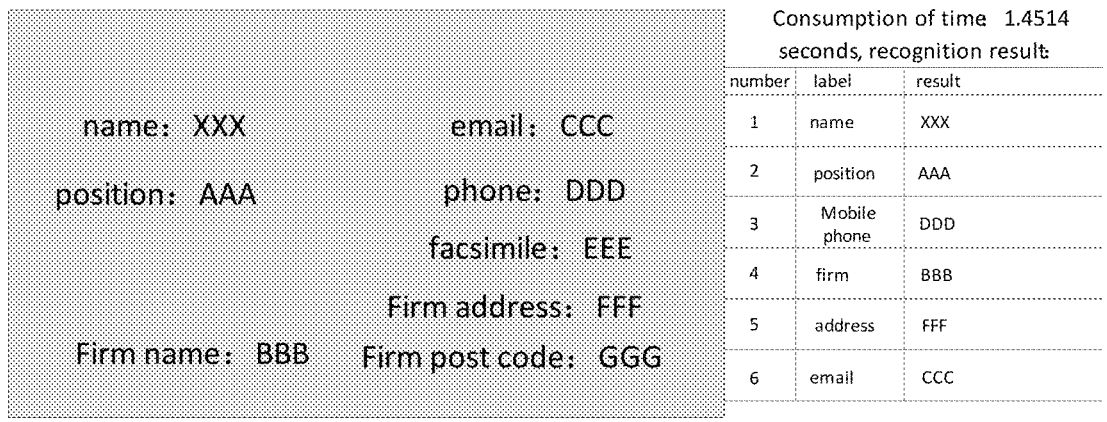
FIGS. 12a-12b show schematic diagrams of stages of character archiving according to some embodiments of the present disclosure.
Figure 12B:
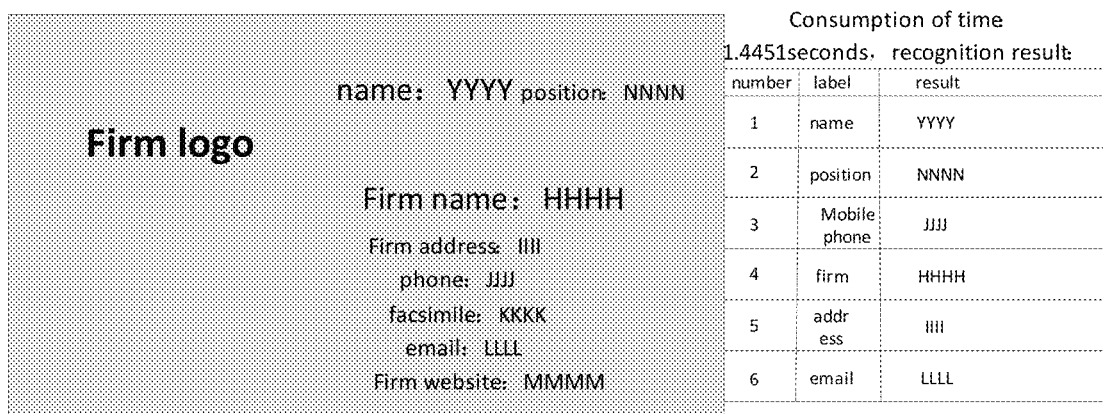

FIGS. 12a-12b show the results of text archiving for different business cards. It can be seen from the figure that, according to the text archiving template, the text archiving of business cards with different typesets can be performed, and the archiving information of the business cards can be extracted according to keywords. The time it takes to archive business cards of different typesets are similar. So far, the recognition of the imaged information-bearing medium is completed, and the recognition method is exited.

Considering that the imaged information-bearing medium may be a label containing a barcode or other forms of medium, in an exemplary embodiment, after the first image of the imaged information-bearing medium is acquired, and before performing text recognition on the first image to acquire the text content of the imaged information-bearing medium, the method further includes: performing barcode detection on the first image.

Figure 13A:
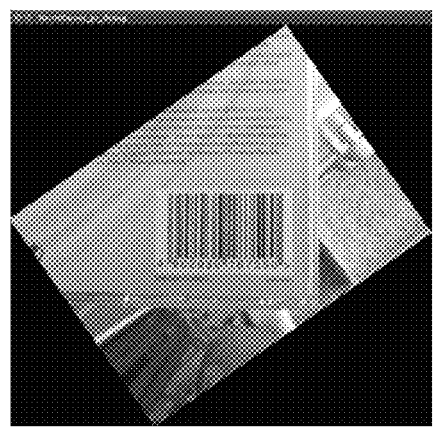
FIGS. 13a-13c show schematic diagrams of stages of the barcode detection according to some embodiments of the present disclosure.
Figure 13B:
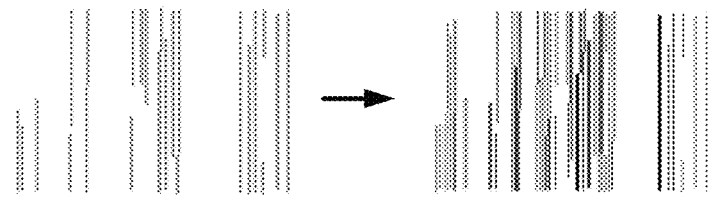
Figure 13C:
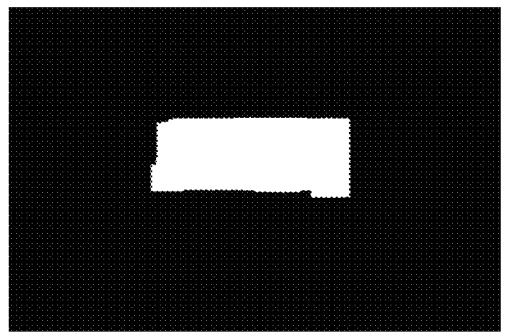
Figure 13D:
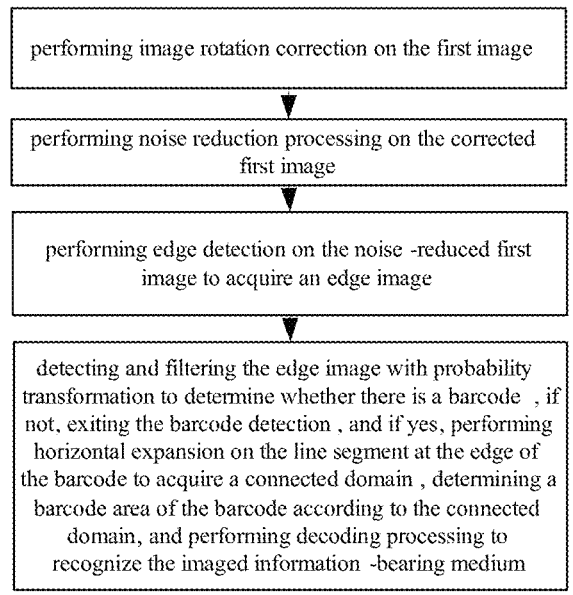
FIG. 13d shows a flowchart of the barcode detection according to some embodiments of the present disclosure.

Taking into account the characteristics of the barcode, as shown in FIG. 13d, in an exemplary embodiment, performing barcode detection on the first image includes: performing image rotation correction on the first image; performing noise reduction processing on the corrected first image; performing edge detection on the noise-reduced first image to acquire an edge image; detecting and filtering the edge image with probability transformation to determine whether there is a barcode, if the result is negative, exiting the barcode detection, if the result is positive, performing horizontal expansion on the line segment at the edge of the barcode to acquire a connected domain, determining the barcode area of the barcode according to the connected domain, and performing decoding processing to recognize the imaged information-bearing medium.

As shown in FIG. 13a-13c, the specific steps of barcode detection and recognition are as follows:

The first step is to perform image rotation correction on the first image.

In this embodiment, as shown in FIG. 13a, the first image is rotated by a rotation angle acquired by the text detection to acquire a forward barcode image.

The second step is to perform noise reduction processing on the corrected first image.

According to some embodiments of the present disclosure, Gaussian smoothing is performed on the first image to reduce image noise.

The third step is to perform edge detection on the noise-reduced first image to acquire an edge image.

According to some embodiments of the present disclosure, Canny edge detection is performed on the noise-reduced first image to acquire an edge image.

The fourth step is to detect and filter the edge image with probability transformation to determine whether there is a barcode. If the result is negative, exiting the barcode detection. If the result is positive, performing horizontal expansion on the line segment at the edge of the barcode to acquire the connected domain, determining the barcode area of the barcode according to the connected domain, performing decoding processing to identify the imaged information-bearing medium.

According to some embodiments of the present disclosure, probabilistic Hough transform line segment detection is performed on the edge image, such as detecting whether the edge image contains the edges of surrounding text or patterns, and eliminating invalid patterns included in the edge image based on the linear characteristics of the barcode. That is, the line segments acquired by the Hough transform are filtered to exclude the line segments that are not the edge of the barcode. For example, use straight line detection to detect the text in the edge image or a straight line in a frame, and use the known barcode direction information of the barcode to judge the detected straight line, to determine whether the detected straight line is from a barcode. Among them, the filtering of straight lines specifically includes:

According to the direction of the barcode, since the direction of the barcode is known, if a difference between the direction of the line segment and the detected direction of the barcode exceed the preset threshold, it is determined that there is no barcode in the edge image, the barcode processing is ended, and the subsequent process is continued to recognize the imaged information-bearing medium, otherwise continue the detection process.

If there is a barcode, based on the characteristic that the edge of the barcode has a corner point, it is detected whether the line segment meeting the threshold has the corner point feature at at least one end. If yes, the line segment is judged to be a seed line segment, otherwise the line segment is used as a candidate line segment.

It is determined whether the distance between an end point of the candidate line segment and an end point of the seed line segment is less than a preset distance threshold, for example, the distance threshold is 2-3 pixels. If it is satisfied, the candidate line segment is the seed line segment, as shown in FIG. 13b, the seed line segment is acquired by expanding the line segment.

Repeat the above process to filter the detected line segments and keep all the seed line segments as barcode edges.

The detected line segments at the edge of the barcode are expanded horizontally to acquire connected domains, that is, the horizontal cores are used to expand the acquired parallel edge line segments to acquire the connected domains.

The barcode area of the barcode is determined according to the connected domain, and the barcode is decoded to be recognized.

According to some embodiments of the present disclosure, the minimum circumscribed rectangle of the connected domain is calculated, and the rectangular area is used as the barcode area. As shown in FIG. 13c, the non-black area in the drawing is the connected domain that is acquired after horizontal expansion, i.e., the barcode area in the edge image.

The corresponding barcode image according to the barcode area is transmitted to the barcode decoding program, the barcode is decoded by, for example, the Zbar decoding program. The specific information of the imaged information-bearing medium is acquired after decoding, the recognition of the imaged information-bearing medium is completed, and the recognition method is exit.

Corresponding to the method for recognizing the imaged information-bearing medium provided in the above embodiments, some embodiments of the present disclosure also provide an apparatus for recognizing the imaged information-bearing medium. Because the apparatus for recognizing the imaged information-bearing medium provided by the embodiments of the present disclosure corresponds to the recognition methods provided in some of the above embodiments. Therefore, the foregoing implementation manners are also applicable to the apparatus for recognizing imaged information-bearing medium provided in some embodiments of the present disclosure, and will not be described in detail.

Figure 14:
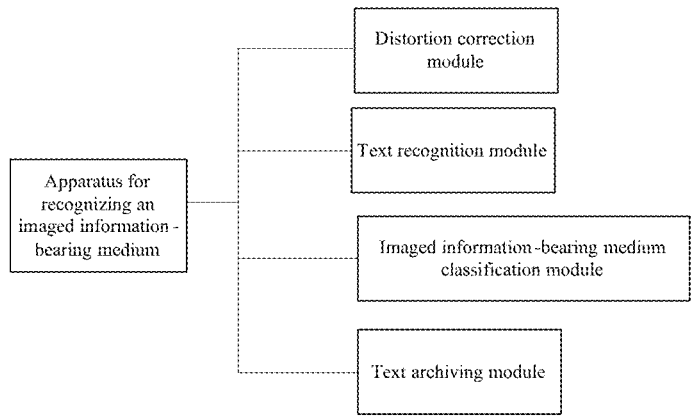
FIG. 14 shows a structural block diagram of an apparatus for recognizing an imaged information-bearing medium according to some embodiments of the present disclosure.

As shown in FIG. 14, some embodiments of the present disclosure also provide an apparatus for recognizing imaged information-bearing medium, including a distortion correction module configured to acquire a first image of the imaged information-bearing medium; a text recognition module configured to perform text recognition on the first image to acquire the text content of the imaged information-bearing medium; an imaged information-bearing medium classification module configured to classify the imaged information-bearing medium to acquire the type of the imaged information-bearing medium; and a text archiving module configured to archive the text content according to the type.

In an exemplary embodiment, the apparatus for recognizing imaged information-bearing medium further includes: a barcode detection module configured to perform barcode detection on the first image.

Some embodiments of the present disclosure provide a computer-readable storage medium on which a computer program is stored, and when the program is executed by a processor, the following processing are realized: based on an acquired image, performing distortion correction on the imaged information-bearing medium in the image to acquire an image of the imaged information-bearing medium; performing text detection on the image of the imaged information-bearing medium to acquire multiple text frame images; performing text recognition on each of the text frame images to acquire multiple pieces of text content; classifying the imaged information-bearing medium to acquire the type of the imaged information-bearing medium; and archiving the multiple pieces of text contents according to the type.

In practical applications, the computer-readable storage medium may adopt any combination of one or more computer-readable medium. The computer-readable medium may be a computer-readable signal medium or a computer-readable storage medium. The computer-readable storage medium may be, for example, but not limited to, an electrical, magnetic, optical, electromagnetic, infrared, or semiconductor system, apparatus, or device, or a combination of any of the above. More specific examples (non-exhaustive list) of computer-readable storage medium include: electrical connections with one or more wires, portable computer disks, hard disks, random access memory (RAM), read-only memory (ROM), erasable programmable read only memory (EPROM or flash memory), optical fiber, portable compact disk read only memory (CD-ROM), optical storage device, magnetic storage device, or any suitable combination of the above. In the embodiments, the computer-readable storage medium may be any tangible medium that contains or stores a program, and the program may be used by or in combination with an instruction execution system, apparatus, or device.

The computer-readable signal medium may include a data signal propagated in baseband or as a part of a carrier wave, and computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device.

The program code contained on the computer-readable medium can be transmitted by any suitable medium, including but not limited to wireless, wire, optical cable, RF, etc., or any suitable combination of the above.

The computer program code used to perform the operations of the present disclosure can be written in one or more programming languages or a combination thereof. The programming languages include object-oriented programming languages—such as Java, Smalltalk, C++, and also conventional procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an internet service provider to connect through the internet).

Figure 15:
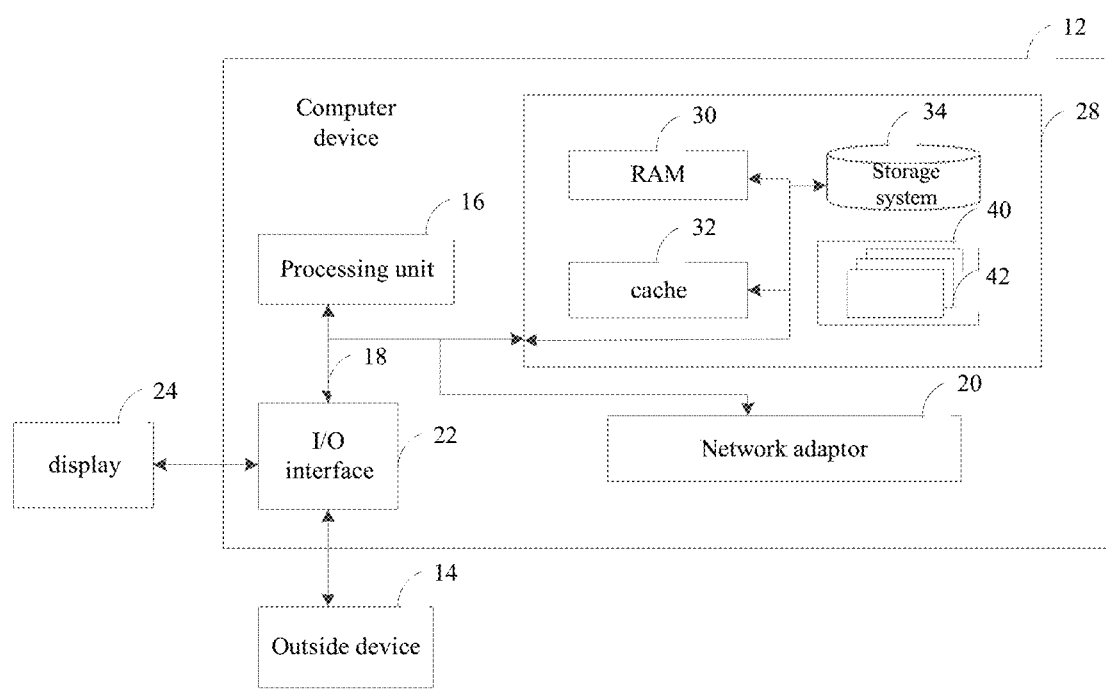
FIG. 15 shows a schematic structural diagram of a computer device according to some embodiments of the present disclosure.

As shown in FIG. 15, a schematic structural diagram of a computer device provided by some embodiments of the present disclosure. The computer device 12 shown in FIG. 15 is only an example, and should not bring any limitation to the function and scope of use of the embodiments of the present disclosure.

As shown in FIG. 15, the computer device 12 is represented in the form of a general-purpose computing device. The components of the computer device 12 may include, but are not limited to: one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, a graphics acceleration port, a processor, or a local bus using any bus structure among multiple bus structures. For example, these architectures include but are not limited to industry standard architecture (ISA) bus, micro-channel architecture (MAC) bus, enhanced ISA bus, Video Electronics Standards Association (VESA) local bus, and peripheral component interconnection (PCI) bus.

The computer device 12 typically includes a variety of computer system readable medium. These medium can be any available media that can be accessed by the computer device 12, including volatile and non-volatile medium, removable and non-removable medium.

The system memory 28 may include computer system readable medium in the form of volatile memory, such as random access memory (RAM) 30 and/or cache memory 32. The computer device 12 may further include other removable/non-removable, volatile/nonvolatile computer system storage medium. For example only, the storage system 34 may be used to read and write non-removable, non-volatile magnetic medium (not shown in FIG. 15 and commonly referred to as a "hard drive"). Although not shown in FIG. 15, a magnetic disk drive for reading and writing to a removable non-volatile magnetic disk (such as a "floppy disk") and an optical disc drive for reading and writing a removable non-volatile optical disk (such as CD-ROM, DVD-ROM or other optical medium) can be provided. In these cases, each drive can be connected to the bus 18 through one or more data medium interfaces. The memory 28 may include at least one program product, the program product having a set (for example, at least one) of program modules, and these program modules are configured to perform the functions of the embodiments of the present disclosure.

A program/utility tool 40 having a set of (at least one) program module 42 may be stored in, for example, the memory 28. Such program module 42 includes but is not limited to an operating system, one or more application programs, other program modules, and program data. Each of these examples or some combination may include the implementation of a network environment. The program module 42 generally executes the functions and/or methods in the embodiments described in the present disclosure.

The computer device 12 can also communicate with one or more external devices 14 (such as a keyboard, pointing device, display 24, etc.), and can also communicate with one or more devices that enable a user to interact with the computer device 12, and/or communicate with any device (such as a network card, modem, etc.) that enables the computer device 12 to communicate with one or more other computing devices. This communication can be performed through an input/output (I/O) interface 22. In addition, the computer device 12 may also communicate with one or more networks (for example, a local area network (LAN), a wide area network (WAN), and/or a public network, such as the Internet) through the network adapter 20. As shown in FIG. 15, the network adapter 20 communicates with other modules of the computer device 12 through the bus 18. It should be understood that although not shown in FIG. 15, other hardware and/or software modules can be used in conjunction with the computer device 12, including but not limited to: microcode, device drivers, redundant processing units, external magnetic disk drive arrays, RAID systems, magnetic tape drives and data backup storage systems, etc.

The processor unit 16 executes various functional applications and data processing by running programs stored in the system memory 28, for example, to implement a method for recognizing an imaged information-bearing medium provided by an embodiment of the present disclosure.

Obviously, the above-mentioned embodiments of the present disclosure are merely examples to clearly illustrate the present disclosure, and are not meant to limit the implementation of the present disclosure. For those of ordinary skill in the art, they can also make other changes or replacements in different forms on the basis of the foregoing description. It is impossible to exhaustively enumerate all the embodiments. Any obvious changes or replacements derived from the technical solutions of the present disclosure are still within the protection scope of the present disclosure.

What is claimed is:

1. A method for recognizing an imaged information-bearing medium, including:
   acquiring a first image of the imaged information-bearing medium comprising:
      performing target detection and correction on the imaged information-bearing medium in an original image based on the acquired original image to acquire the first image;
   performing text recognition on the first image to acquire a text content of the imaged information-bearing medium;
   classifying the imaged information-bearing medium to acquire a type of the imaged information-bearing medium; and
   archiving the text content according to the type,
   wherein performing text recognition on the first image to acquire a text content of the imaged information-bearing medium includes:
      performing text detection on the first image to acquire multiple second images; and
      recognizing the multiple second images with a preset text recognition network model to acquire the text content of the imaged information-bearing medium;
   wherein performing target detection and correction on the imaged information-bearing medium in an original image based on the acquired original image to acquire the first image comprises:
      performing image binarization based on the acquired original image;
      performing edge detection to acquire an outline of the largest rectangle in the original image, or performing straight line detection to acquire groups of a horizontal straight line set and a vertical straight line set, and merging approximate parallel lines to determine an optimal boundary and vertices of the imaged information-bearing medium;
      segmenting the first image from the original image by perspective transformation.

2. The method of claim 1, wherein acquiring a first image of the imaged information-bearing medium further comprises:
   determining whether a deformation of the first image is within a preset degree of deformation, and
   when the deformation of the first image goes beyond the preset degree of deformation, performing text direction detection on the first image and rotating the first image to correct the first image.

3. The method of claim 2, wherein performing text direction detection on the first image and rotating the first image to correct the first image comprises:
   performing text direction detection on the first image with a preset full-angle text detection classification model and output a rotation angle; and
   rotating the first image by the rotation angle.

4. The method of claim 1, wherein performing text detection on the first image to acquire multiple second images comprises:
   acquiring axial symmetric bounding boxes according to the first image;
   performing text score prediction on each axial symmetric bounding box to acquire area box with minimum inclination; and
   detecting weak and small texts in the area box with minimum inclination and acquire the multiple second images.

5. The method of claim 1, wherein the preset text recognition network model comprises a CRNN text recognition network model, and the CRNN text recognition network model combines both a CNN convolutional neural network and an RNN recurrent neural network,
   wherein recognizing the multiple second images with a preset text recognition network model to acquire the text content of the imaged information-bearing medium includes:
      inputting the multiple second images into the CRNN text recognition network model; and
      recognizing the multiple second images as character strings according to a process of the CNN convolutional neural network-LSTM long short-term memory network-CTC connectionist temporal classification.

6. The method of claim 1, wherein archiving the text content according to the type comprises:
   archiving the text content using a preset corresponding text archiving template according to the type, and acquiring archiving information of the imaged information-bearing medium.

7. The method of claim 1, wherein after acquiring the first image of the imaged information-bearing medium, and before performing text recognition on the first image to acquire a text content of the imaged information-bearing medium, the method further includes:
   performing barcode detection on the first image.

8. The method of claim 7, wherein performing barcode detection on the first image comprises:
   performing image rotation correction on the first image;
   performing noise reduction processing on the corrected first image;
   performing edge detection on the noise-reduced first image to acquire an edge image; and
   detecting and filtering the edge image with probability transformation to determine whether there is a barcode, if not, exiting the barcode detection, and if yes, performing horizontal expansion on the line segment at the edge of the barcode to acquire a connected domain, determining a barcode area of the barcode according to the connected domain, and performing decoding processing to recognize the imaged information-bearing medium.

9. The method of claim 1, wherein classifying the imaged information-bearing medium to acquire a type of the imaged information-bearing medium comprises:
   performing rough classification on the imaged information-bearing medium according to an aspect ratio of the first image; and
   performing fine classification on the roughly classified imaged information-bearing medium using a preset corresponding image classifier and based on the first image, to acquire the type of the imaged information-bearing medium.

10. The method of claim 1, wherein classifying the imaged information-bearing medium to acquire a type of the imaged information-bearing medium comprises:
    performing rough classification on the imaged information-bearing medium according to an aspect ratio of the first image; and
    performing fine classification on the roughly classified imaged information-bearing medium using a preset corresponding text classifier and based on the text content, to acquire the type of the imaged information-bearing medium.

11. A computer-readable storage medium on which a computer program is stored, when the program is executed by a processor, the processor is configured to perform the method of claim 1.

12. A computer device, comprising a storage, a processor, and a computer program stored in the storage and capable of running on the processor, and when the processor executes the program, the processor is configured to perform the method of claim 1.

13. An apparatus for recognizing an imaged information-bearing medium, comprising:
    a distortion correction module configured to acquire a first image of the imaged information-bearing medium, wherein in order to acquire a first image of the imaged information-bearing medium, the distortion correction module is configured to:
       perform target detection and correction on the imaged information-bearing medium in an original image based on the acquired original image to acquire the first image;
    a text recognition module configured to perform text recognition on the first image to acquire a text content of the imaged information-bearing medium;
    an imaged information-bearing medium classification module configured to classify the imaged information-bearing medium to acquire a type of the imaged information-bearing medium; and
    a text archiving module configured to archive the text content according to the type,
    wherein the text recognition module is further configured to:
       perform text detection on the first image to acquire multiple second images; and
       recognize the multiple second images with a preset text recognition network model to acquire the text content of the imaged information-bearing medium;
    wherein in order to perform target detection and correction on the imaged information-bearing medium in an original image based on the acquired original image to acquire the first image, the distortion correction module is further configured to:
    perform image binarization based on the acquired original image;
    perform edge detection to acquire an outline of the largest rectangle in the original image, or perform straight line detection to acquire groups of a horizontal straight line set and a vertical straight line set, and merge approximate parallel lines to determine an optimal boundary and vertices of the imaged information-bearing medium;
    segment the first image from the original image by perspective transformation.

14. The apparatus for recognizing an imaged information-bearing medium of claim 13, further comprising:
    a barcode detection module configured to perform barcode detection on the first image.

* * * * *